United States Patent [19]

Simonet

[11] Patent Number: 5,204,533
[45] Date of Patent: Apr. 20, 1993

[54] DEVICE FOR LOCALIZING RADIATION SOURCES IN REAL TIME

[76] Inventor: Geneviève Simonet, 33 Avenue du Président Kennedy, 91300 Massy, France

[21] Appl. No.: 594,959

[22] Filed: Oct. 10, 1990

[30] Foreign Application Priority Data

Oct. 11, 1989 [FR] France .................... 89 13281

[51] Int. Cl.⁵ .............................................. G01T 1/29
[52] U.S. Cl. ................................ 250/361 R; 378/63
[58] Field of Search ............ 378/63, 147; 250/361 R; 358/110

[56] References Cited

U.S. PATENT DOCUMENTS

| | | | |
|---|---|---|---|
| 3,107,276 | 10/1963 | Cohen | 358/110 |
| 4,471,378 | 9/1984 | Ng | 358/111 |
| 4,797,701 | 1/1989 | Lannes | 354/288 |

OTHER PUBLICATIONS

Wiltshire, "Pinhole Camera Locates Sources of Gamma Radiation", Nucleonics, Mar. 1962, p. 76.
"A computer controlled television detector for light, X-rays and particles" 8100 IEEE Trans. on Nuclear Science—vol. 28 (1981) Feb. No. 1, New York, pp. 852–856.

Primary Examiner—Carolyn E. Fields
Attorney, Agent, or Firm—Pollock, Vande Sande & Priddy

[57] ABSTRACT

Device for the real-time localization of radiation sources, comprising a pinhole chamber (4) whose walls form a shield, and, within the chamber and opposite the pinhole (16), a screen (28) which is transparent in the luminous range and capable of converting the source radiation into luminous radiation and of preventing the light in the area from reaching the screen while remaining transparent to the source radiation. A camera (30) is connected to the screen and provides an image of the sources in the form of electric signals, by virtue of the luminous radiation it receives from the screen, as well as an image of the area by virtue of the light it receives from this area through the screen when a shutter is open. The images can be superposed and can be made visible through signal processing and display.

14 Claims, 3 Drawing Sheets

DEVICE FOR LOCALIZING RADIATION SOURCES IN REAL TIME

FIELD OF THE INVENTION

The present invention concerns a device used for the real time localization of radiation sources, in particular those to the localization of radiation sources which may be contained in a space such as a high-activity cell or which are accidentally present in a room.

BACKGROUND OF THE INVENTION

The invention represents an improved version of the device disclosed in U.S. Pat. No. 4797701, which, in order to localize radiation sources, uses a pinhole chamber in which a radiation-sensitive film and a film sensitive to the visible light in the area in which the radiation sources are liable to be found, are placed. The shutter, whose opening allows the taking of a photograph by visible light, is transparent to the radiation emanating from the sources.

After developing and superimposing these films, the radiation sources can be localized in their environment.

The device described in the above-mentioned patent has the disadvantage of not enabling the localization of the radiation sources in real time. It therefore makes it necessary to work "blind" as regards the detected sources and the time required to take the photograph, and it requires development time before the results are obtained.

Furthermore, to obtain a second photograph, the device requires that the camera be removed from the work area and that film be reloaded. This operation may require a long period of time, especially to obtain a stereoscopic view of the sources.

Moreover, without a stereoscopic view of the sources, ambiguity about their positions may exist in some cases: are they in front of or behind a particular object, and at what distance from the latter?. The quantification of the position of the sources under study may prove impossible, since only the direction and radiation at the site of the measuring apparatus are known, and not the exact position.

SUMMARY OF THE INVENTION

The purpose of the present invention is to remedy these disadvantages. It uses, instead of two films, a luminescent screen which converts the radiation from the sources into luminous radiation and which is transparent to the light emanating from the area under observation; and a camera connected optically to the screen, which makes it possible to obtain, as electric signals, an image of the area and of the sources.

More specifically, the object of the present invention is a device for the localization of radiation sources liable to be found in an area, this device comprising a pinhole chamber whose walls form a shield against the radiation from the sources and means for shuttering the pinhole chamber, these shutter means being transparent to the radiation from the sources. This device is characterized by the fact it also comprises, within the pinhole chamber and facing the pinhole, a luminescent screen which is transparent in the luminous range and capable of converting the radiation from the sources into luminous radiation; that the shuttering means are, furthermore, capable of preventing the light from the area from reaching the screen; and that the device also comprises a camera which is connected optically to the screen and is capable of providing an image from the sources in the form of electric signals by virtue of the luminous radiation it receives from the screen, as well as an image of the area, by virtue of the light it receives from this area through the screen when the shutter means are open, the sensitivity of the camera being sufficient to ensure that an acceptable image of these sources is obtained for a given radiation-detection efficiency, the images being visible and suitable for superposition through the use of means for the processing and display of electric signals.

According to a first embodiment of the device according to the invention, the camera is placed in a pinhole chamber; it comprises an entry aperture placed against the screen.

According to a second embodiment, the camera is positioned outside of the pinhole chamber and is connected optically to the screen by means of a bundle of optical fibers whose end is placed against the screen, in the pinhole chamber.

The pinhole chamber may contain a collimator bounded by a cone-shaped wall whose narrowest part constitutes the pinhole.

Alternatively, the collimator may be bounded by a double cone-shaped wall formed from two cones having the same aperture and whose tips are set opposite each other. The tips constitute the pinhole.

The pinhole may constitute a double diaphragm, i.e., a small diaphragm allowing the passage of radioactive radiation and light, and a large diaphragm allowing only the passage of radioactive radiation.

The camera is preferably a load-transfer camera having two-stage intensification.

A camera of this type is especially suited to the present invention. Indeed, a luminescent screen which is transparent in the visible range normally proves only minimally effective for radiation such as gamma radiation, a deficiency which requires the concomitant use of a very sensitive camera.

The device according to the invention may also comprise retractable attenuation means, which are provided so as to attenuate the radiation from the sources before the latter reaches the screen.

These attenuation means make it possible to determine the energy of the radiation emanating from a localized source, through a comparison with the image of the source (with respect to the radiation this source emits) when the attenuation means are retracted, and with the image of the source when the attenuation means ar not retracted.

The device according to the invention may also comprise an adjustable range finder positioned near the pinhole chamber and capable of determining the distance between each radiation source and the device.

It may also comprise an adjustable light source unitary with the range finder and intended to illuminate each radiation source whose distance from the device the range finder is designed to measure. The corresponding light will preferably falls within the range of sensitivity of the camera.

One particularly interesting embodiment calls for the use of a range finder comprising a laser, which acts simultaneously as an illumination source. Data concerning distances between each source of radiation and the device are used to determine the activity of these sources.

Finally, according to one specific embodiment of the device, the latter is carried by a movable support whose position is known fully and continuously, and which makes it possible to take complementary photographs that are either symmetrical or taken at precisely-determined positions closer or farther distant from the object. The processing and display means allow stereoscopic vision, the calculation of the distance between the sources and the photographic plane, and the calculation of the intensity of the radiation in contact with the sources.

The radiation emanating from the sources may be gamma radiation.

BRIEF DESCRIPTION OF THE DRAWINGS

The present invention will be better understood from a reading of the following description of several embodiments offered purely by way of example and with reference to the attached drawings, in which.

DETAILED DESCRIPTION

Figure 1:
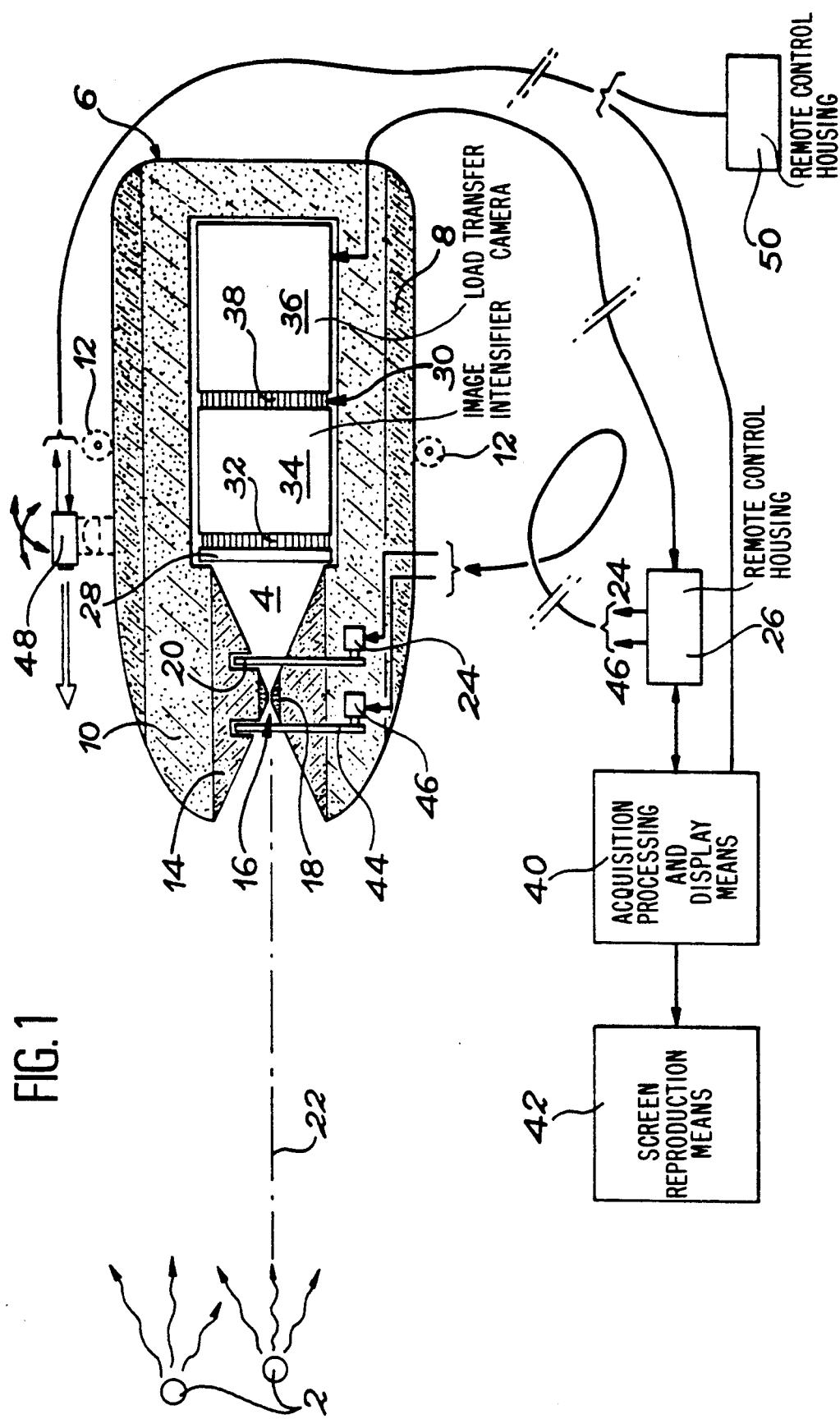
FIG. 1 is a schematic view of a first embodiment of the device according to the invention, said device comprising a camera placed in a pinhole chamber.

The device according to the invention, represented schematically in FIG. 1, is designed, for example, to localize gamma radiation sources 2 which are liable to be found in an area such as a room.

As in the above-mentioned patent to which reference will be made, the device illustrated in FIG. 1 comprises a pinhole chamber 4 formed inside a body 6 constituting a shield preventing the gamma radiation from reaching the chamber 4. This body 6 can be made of a suitable tungsten-based alloy, for example the alloy known as "DENAL." The high density of this alloy imparts to it an effective radiation-attenuation capability. The use of this material thus makes it possible to reduce the thickness of the shield and, consequently, the cumbersomeness and weight of the device.

The body 6 may comprise a movable peripheral part 8 in which the remainder 10 of the body is inserted, thereby facilitating the choice of a peripheral shield 8 having a greater or lesser thickness depending on the greater or lesser level of activity of the surrounding sources 2.

FIG. 1 also shows means 12, which symbolize an adjustable support 6 for the body, and thus for the device.

The remaining part 10 of the body 6 comprises a collimator 14 positioned opposite the chamber 4. The wall of the collimator 14 is composed of two cones whose angle of opening is identical and whose tips are set opposite each other, this common point being pierced so as to form the pinhole 16.

As in the above-mentioned patent, the collimator 14 may comprise, at the site of the pinhole 16 and surrounding it, an element 18 which is opaque to (visible) light emanating from the area under observation, but which is permeable to gamma radiation, so as to register any possible insufficiency of activity of the gamma radiation sources 2 which are to be localized (dual-diaphragm pinhole).

Furthermore, the collimator 14 may be interchangeable, thereby making possible the selection of a single- or double-diaphragm collimator whose opening is adapted to the supposed activity of the gamma sources 2 to be localized.

The device comprises, furthermore, a mechanical shutter 20 intended to prevent visible light emanating from the area under study from penetrating the chamber 4, while the gamma radiation is allowed to pass through. This shutter 20 is a camera iris or, for example, a retractable metal plate perpendicular to the axis 22 of the body 6 and is positioned in proximity to the pinhole 16 on the chamber 4 side. The movements of the plate constituting the shutter 20 are remote-controlled using electromechanical means 24, which are in turn controlled by a remote-control housing 26. The latter may be placed at a great distance from the device if the source activity is high.

The device also comprises, within the chamber 4 and opposite the pinhole 16, a luminescent screen 28 resting against an internal circular shoulder of the body 6 and at the base of the conical wall of the collimator 14, a wall which widens progressively as it approaches the chamber 4.

The luminescent screen 28 is transparent in the visible range and can convert gamma radiation from the sources 2 reaching it through the collimator 14 into radiation which is visible to a camera 30 also incorporated into the device in the chamber 4, and which is intended to supply, in the form of electric signals, an image of the scene which this camera observes through the pinhole 16 (when the shutter 20 is open). The entry aperture 32 of the camera 20 is pressed against the screen 28, the latter thus being placed between the pinhole 16 and the camera 30.

The screen 28 makes possible the detection of gamma photons emitted by each observed source 2. The interaction of the gamma photons with the screen leads to the emission of visible light which normally falls on the camera entry aperture. The intensity of this visible light depends, of course, on the activity produced by the source and on the distance between the source and the device, but also on the efficiency of the luminescent screen 28 as regards gamma radiation.

In order to ensure a greater probability of interaction between the gamma photons and the scintillant material from which the screen is made, this material will preferably be dense and give a high luminous output. Further, the screen will preferably be thin (thickness of several mm), so as to provide good spatial resolution.

The camera 30 will preferably be very sensitive so as to allow use of a thin screen made of a scintillation material which is transparent in the visible range; furthermore, it will possess good detection sensitivity to gamma radiation travelling over long distances. It is also preferable that the camera 30 possess substantial resistance in a gamma environment and high reliability, thus allowing quantitative measurements.

The choice of the screen material depends on the activity of the sources to be localized. If the activity is very low, a screen made of sodium iodide can be used; if it is not too high, a screen made of bismuth germanate (BGO) can be used; if it is high, a screen made of a scintillant plastic material suitable for the detection of X-radiation, beta radiation, etc., can be used.

Thus, in 10 seconds and using a screen made of BGO and 3 mm thick, an image can be made of a gamma radiation source of 60 Co and 2 Ci placed at a distance of 3 m from the device, using a load-transfer camera employing two-stage intensification.

For informational, and strictly non-limitative, purposes, use is made of a camera 30 of the kind marketed by the Lhesa company, which has a sensitivity of $10^{-7}$ lux and which comprises an entry aperture 32 containing sections of optical fibers, this aperture being followed by a first-generation image intensifier 34, which is followed, in turn, by a load-transfer camera LH 5038 bearing the reference 36 in FIG. 1. Connection means 38 employing optical fiber sections connect the camera 36 to the intensifier 34.

This camera 30, composed of elements 32 to 38 and protected from gamma radiation by the shield formed by the body 6, is small enough so that the shielded device in which it is installed can be portable and can be inserted in conventional openings ("channels") of the high-activity cells (for example, the openings of 170 mm remote manipulators).

The housing 26 is also provided to control the camera 30, and especially to zero reset the gain of that camera when the shutter 20 opens, given the great sensitivity of the camera (this zero reset can also be effected by an automatic safety device).

The device shown in FIG. 1 is connected to means 40 for the real time acquisition, processing, and visualization of the electric signals transmitted by the camera 30. These acquisition, processing, and display means 40, are, for example, of the kind marketed by the ICAP company under the brand name Visicap.

These means may be connected to screen-reproduction means 42 used for the storage of displayed images. Documentation of this kind can be used at the work site, in report presentations, etc.

When the shutter 20 is closed, the image of the gamma radiation sources is obtained after a period of time (several seconds, or 10 s, for example). This image is stored in a first memory area of the means 40.

Next, by controlling the opening of the shutter 20 during a fraction of a second, an image (in visible light) of the zone under study in which the sources 2 are located, is obtained virtually instantaneously. This second image is also stored, this time in a second memory area of the means 40 separate from the first memory area.

After processing the images, and in particular the coloration of "spots" resulting from the activity of the sources 2, in order to localize these sources and distinguish their "gamma luminosity" from the luminosity (in visible light) of objects present in the area under observation which do not, however, emit any gamma radiation, the first and second images are displayed superimposed on the screen belonging to the means 40, thereby allowing the localization of the gamma radiation sources.

The device illustrated in FIG. 1 may comprise, furthermore, retractable means 44 for the attenuation of gamma radiation before the latter reaches the screen 28. These means 44 are constituted, for example, by a tungsten screen having a thickness of approximately 1 to 3 mm, and which is perpendicular to the axis 22 of the device and is placed in proximity to the pinhole 16 on the side of the collimator 14 which opens toward the outside of the device.

The tungsten screen and the plate 20 may move in a suitable housing in the body 6, or be installed at the collimator entry.

Electromechanical means 46 are provided in the body 6 to control the retraction and positioning of the screen 44. These means 46 are themselves controlled from the housing 26 furnished for that purpose.

The screen 44 makes it possible to evaluate the transmitted energy of the gamma photons. The intensity of the spot on the image of the sources linked to a gamma radiation source is lower when the tungsten screen 44 seals off the collimator 14 than when it is retracted, especially since the radiation energy level is low.

The device may also be used to take measurements of the activity of the sources 2. To facilitate and automate this calculation, the device is fitted with an adjustable laser range finder 48, whose adjustment is remote-controlled using a housing 50 furnished for this purpose. A range finder of this type is marketed by the ARIES company.

The laser range finder 48 is used to measure the distance from each source to the device. Its zone of emission lies, for example, in the same plane as the luminescent screen 28, the latter also being chosen so as to convert into radiation visible to the camera, the radiation emitted by the laser and which reflects off the various objects in the area, and in particular the sources 2 (radioactive metal bars, for example).

In this way, a screen made of BGO is rendered sensitive to an infrared laser beam.

Once the sources 2 have been localized by means of the device and displayed using means 40, the gain of the camera 30 is regulated to a very low level, and the laser beam emitted by the range finder 48 is shifted until it falls on one of the sources whose activity is to be calculated (the activity received varying as an inverse function of the square of the distance from the source), the shift of the reflected beam being monitored on the screen belonging to the means 40.

The Visicap unit, furnished with a special card and connected to the laser range finder, then furnishes the distance sought. The activity of the source can then be determined.

For this purpose, standardization is preliminarily conducted using standardized sources whose activity is known and whose intensity, read by the camera at a given distance and for a given adjustment, is measured.

Figure 2:
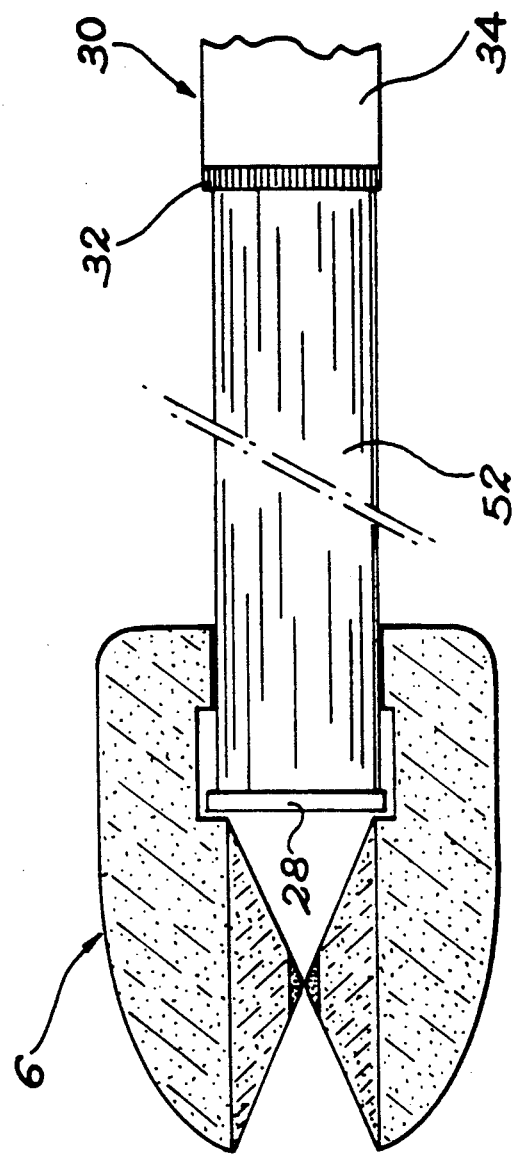
FIG. 2 is a schematic view of a second embodiment of the device according to the invention, comprising a camera placed outside the pinhole chamber.

The device according to the invention, as schematically and partially represented in FIG. 2, differs from the one illustrated in FIG. 1 by virtue of the fact that the camera 30 is no longer in the chamber, but installed outside of the body 6 from which it may be quite distant, thus making it possible to position the camera outside of the space to be investigated, for example, outside of the high-activity cell. A bundle of optical fibers 52 capable of conducting the visible radiation emitted by the screen and the visible light in the area under study links the screen 28 to the camera 30 through the body 6. One end of the fiber bundle normally ends at the screen and covers its surface.

The other end of the bundle normally ends at the entry aperture 32 of the camera and covers it.

The device according to the invention may be carried on a support which is robotized or at least articulated in a sliding arrangement, which may have up to 6 degrees of freedom of movement and whose position is fully known at each instant, thus making it possible to take supplemental photographs which are either symmetrical (stereoscopic views) or precisely-determined distant or close-up views. The signal-processing means 40 are thus furnished to allow slightly differentiated stereoscopic views on one or two screens with adapted optics, whether portable or not, the calculation of the distance of the sources in relation to the photographic plane, and, finally, a calculation of the intensity of the radiation in contact with the sources.

Taking two views in the same plane, one offset from the other by several tens of centimeters, makes it advantageously possible to take advantage of the fact that the sources are generally mobile only to a very limited extent or move slowly with respect to image acquisition, so as to obtain two plainly comparable images, the only difference being that they represent the scene from two different angles. This difference is exploited by a computer and display means adapted to give the operator a stereoscopic view of the scene while removing all ambiguity concerning the exact position of the sources. One additional advantage is that this same work allows access to the distance separating each source from the photographic device. This distance is of indispensable value in calculating the radiation in contact with the source, a calculation which the operator almost always intends to make.

Taking two views which are offset in relation to one another, but one of which is closer to the sources and the other farther removed, makes it advantageously possible, by means of the appropriate processing of the images and of the intensity of each pixel, while taking into account the fact that the radiation emanating from one pinpoint source is attenuated by the reciprocal of the square of the distance, to reconstitute, by computerized calculation, the radiation in contact with the radioactive sources.

The availability of a support of this kind makes it advantageously possible to have access to all of these data in a very short time, because of the ease, rapidity, and precision of the movements of this support.

Figure 3:
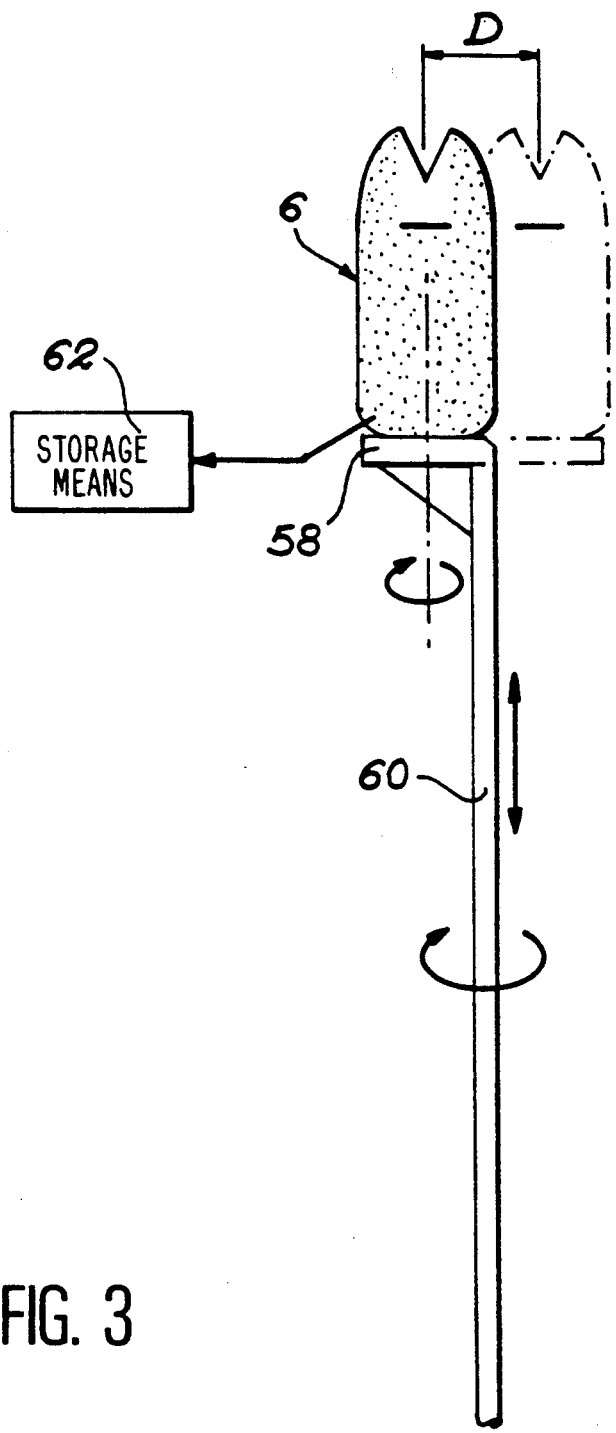
FIG. 3 is a schematic representation of a movable support designed to carry the device according to the invention.

A device according to the invention, for example of the kind illustrated in FIG. 1, may be carried by a support 58 articulated and capable of sliding, as shown in FIG. 3 in a preferred embodiment of the invention, this support being displaced off center in relation to its main axis 60. Once the first view has been taken and stored by means 62 comparable to the means 40 described above, a second view similar to the first is taken, for example by rotating by 180° the main axis 60 of the support 58, and a second view of the scene, comprising both a visible and a radioactive image, is retaken at a distance D equal to twice the length of the support assembly, i.e., at a known distance. The processing of these images, offset by several tens of centimeters, and their projection on cathodic screens, make it possible to reconstitute the stereoscopic view for an observer equipped with the requisite glasses, for example glasses having polarized lenses, binocular glasses or synchronized shutter glasses, all of which are conventional systems. (The processing of these offset images involves the rotational processing of the memory-plane in order to restore the second view. As a variant, to achieve this restoration, the rotational processing is not performed, but rather the device is rotated on the support 58 when the latter turns.)

The observer thus has a stereoscopic, although slightly differentiated, view of the sources, and can advantageously localize them without ambiguity.

The support 58 can slide so as to be brought closer or moved farther away from the plane of the sources to be observed and to retake another view. The processing of this last view, as compared to the first, makes it possible to reconstitute the radiation in contact with the sources, by taking into account the differing intensities of the pixels.

Finally, the digitalized stereoscopic photographs may be processed by computer and make it possible to calculate with precision the distances which separate the various elements of the scene from the device according to the invention, for example by moving a cursor on the screen linked to a "mouse," by "clicking" the "mouse." These data facilitate further the calculation of the radiation in contact with the sources.

The preceding description relates to the visualization of gamma sources and makes use of a conventional camera which is sensitive to visible radiation.

The invention is not limited to this illustrated case, and encompasses, in particular, the detection of X and beta radiation sources (by means of a screen made of a scintillant plastic material, for example, as already described above), as well as the use of an infrared camera to record an infrared image of the environment.

In addition to its application to the search for radioactive sources which are accidentally present in a space and which the operators can locate without harm, the device according to the invention facilitates considerably the operations undertaken in high-activity cells. It makes it possible, in fact, to identify the active independent objects that can be moved, the stationary elements that must be shielded or cut out, and the contaminated areas that must be cleaned. In this way, the personnel working in these areas can be protected, and the follow-up measures to the packaging of radioactive waste can be specified.

The invention also applied to the identification of accumulations of fissionable materials, not only by means of visualization (in accordance with already-established procedures, such visualization can be carried out, moreover, using a camera and processing with correlation programs), but also by activity detection, thus facilitating greatly the identification of these accumulations. Moreover, these activity data are valuable, particularly prior to sending these accumulations to a reprocessing center.

What is claimed is:

1. Device for the localization of radiation sources (2) liable to be found in a given area, said device comprising a pinhole chamber (4) whose walls from a shield against the radiation emanating from said sources, and means (20) for shuttering said pinhole chamber, said shuttering means being transparent to radiation from said sources, said device comprising, furthermore, in said pinhole chamber and opposite a pinhole (16), a luminescent screen (28) which is transparent in a luminous range and which is capable of converting said radiation from said sources into luminous radiation, said shuttering means being, in addition, capable of preventing light from said area from reaching said screen, said device also comprising a camera (30) connected optically to said screen and capable of providing, in the form of electric signals, an image of said sources by means of luminous radiation which said camera receives from said screen, and an image of said area by means of said light which said camera receives from said area through said screen when said shuttering means are open, sensitivity of said camera being sufficient to ensure that an acceptable image of said sources will be obtained for a given radiation-detection efficiency of said screen, said image of said area and said image of said sources being capable of superposition and being visible through use of means (40) for processing and display of said electric signals.

2. Device according to claim 1, wherein said camera (30) is positioned in said pinhole chamber and comprises an entry aperture (32) positioned against said screen (28).

3. Device according to claim 1, wherein said camera (30) is placed outside of said pinhole chamber and is connected optically to said screen (28) by means of a bundle of optical fibers (52), one end of said bundle being placed in said pinhole chamber against said screen (28).

4. Device according to claim 1 wherein said pinhole chamber (4) comprises a collimator bounded by a cone-shaped wall whose narrowest part constitutes said pinhole (16).

5. Device according to claim 1, wherein said pinhole chamber (4) comprises a collimator (14) bounded by a wall formed from a double cone composed of two cones having a same opening dimension and having tips set opposite one another, said tips constituting said pinhole (16).

6. Device according to claim 1, wherein said pinhole (16) constitutes a double diaphragm, i.e., a diaphragm of a first size allowing passage of radioactive radiation and of light, and a diaphragm of a size greater than said first size allowing passage of radioactive radiation only.

7. Device according to claim 1, wherein said camera (30) is a charge coupled type camera having two-stage intensification.

8. Device according to claim 1, further comprising retractable attenuation means, said attenuation means being provided to attenuate said radiation emanating from said sources (2) before it reaches said screen (28).

9. Device according to claim 1, wherein said device is carried by a movable support (58) having a position which is known on a continuing basis and which thereby enables the taking of complementary photographs which are either symmetrical or are taken from precisely-determined, distant or close-up positions, and wherein said processing and display means (40) are provided to enable stereoscopic views, calculation of the distance from said sources (2) in relation to the photographic plane, and calculation of the intensity of the radiation in contact with said sources.

10. Device according to claim 1, wherein said radiation sources localized by said device are gamma radiation sources, and said luminescent screen (28) is responsive to gamma radiation.

11. Device for the localization of radiation sources (2) liable to be found in a given area, said device comprising a pinhole chamber (4) whose walls form a shield against the radiation emanating from said sources, and means (20) for shuttering said pinhole chamber, said shuttering means being transparent to radiation from said sources, said device comprising, furthermore, in said pinhole chamber and opposite a pinhole (16), a luminescent screen (28) which is transparent in luminous range and which is capable of converting said radiation from said sources into luminous radiation, said shuttering means being, in addition, capable of preventing light from said area from reaching said screen, said device also comprising a camera (30) connected optically to said screen and capable of providing, in the form of electric signals, an image of said sources by means of luminous radiation which said camera receives from said screen, and an image of said area by means of aid light which said camera receives from said area through said screen when said shuttering means are open, sensitivity of said camera being sufficient to ensure that an acceptable image of said sources will be obtained for a given radiation-detection efficiency of said screen, said image of said area and said image of aid sources being capable of superposition and being visible through use of means (40) for processing and display of said electric signals, wherein said device is carried by a movable support (58) having a position which is known on a continuing basis and which thereby enables the taking of complementary photographs which are either symmetrical or are taken from precisely-determined, distant or close-up positions, and wherein said processing and display means (40) are provided to enable stereoscopic views, calculation of the distance from said sources (2) in relation to the photographic plane, and calculation of the intensity of the radiation in contact with said sources.

12. Device according to claim 1 or 11, further comprising an adjustable range finder (48) positioned in proximity to said pinhole chamber (4) and capable of determining the distance from each of said radiation sources to said device.

13. Device according to claim 12, comprising an adjustable light source unitary with said range finder and provided to illuminate each said radiation source the distance between which and said device is to be measured by said range finder.

14. Device according to claim 12, wherein said range finder comprises a laser acting simultaneously as a source of illumination of said radiation sources.

* * * * *